United States Patent [19]
Kustermann et al.

[11] Patent Number: 5,472,504
[45] Date of Patent: * Dec. 5, 1995

[54] COATING DEVICE FOR RUNNING WEBS OF PAPER OR CARDBOARD

[75] Inventors: Martin Kustermann, Heidenheim, Germany; Sergio Giuste, Jaragua Sao Paulo, Belize

[73] Assignee: J.M. Voith GmbH, Heidenheim, Germany

[*] Notice: The portion of the term of this patent subsequent to May 31, 2011, has been disclaimed.

[21] Appl. No.: 180,234

[22] Filed: Jan. 12, 1994

[30] Foreign Application Priority Data

Jan. 28, 1993 [DE] Germany .......................... 43 02 373.8

[51] Int. Cl.⁶ .................................................. B05C 11/06
[52] U.S. Cl. .......................... 118/663; 118/126; 118/413; 118/708; 118/712
[58] Field of Search .................................... 118/712, 126, 118/413, 663, 708; 15/256.5, 256.51; 100/174; 162/281

[56] References Cited

U.S. PATENT DOCUMENTS

| | | | |
|---|---|---|---|
| 3,783,781 | 1/1974 | Grommek | 15/256.51 |
| 4,880,672 | 11/1989 | Ericksson | 118/126 |
| 4,919,756 | 4/1990 | Sawdai | 15/256.5 |
| 5,085,168 | 2/1992 | Sollinger | 118/126 |
| 5,134,958 | 8/1992 | Zimmer | 118/126 |
| 5,221,351 | 6/1993 | Esser et al. | 118/712 |
| 5,242,498 | 9/1993 | Kohler et al. | 118/663 |
| 5,316,584 | 5/1994 | Ueberschär et al. | 118/413 |

Primary Examiner—W. Gary Jones
Assistant Examiner—Laura E. Edwards
Attorney, Agent, or Firm—Marshall, O'Toole, Gerstein, Murray & Borun

[57] ABSTRACT

A coating device having a blade for metering a coating material onto a running web of paper or cardboard guided by a roll includes at least one noncontacting sensor disposed near the blade and between apparatus for adjusting the transverse profile of coating. The sensor provides a signal indicating the position of the blade. The device also includes a receiver for receiving the signal of the sensor and a control device for controlling the angular position of the blade as a function of the sensor signal. The angle of contact of the blade on the roll is determined as a function of the known pressing pressure (or a corresponding proportional value thereof) of the blade caused by the profile adjustment apparatus, preferably determined by a computer or microprocessor.

4 Claims, 1 Drawing Sheet

5,472,504

COATING DEVICE FOR RUNNING WEBS OF PAPER OR CARDBOARD

BACKGROUND OF THE INVENTION

FIELD OF THE INVENTION

The invention is concerned with a device for metering with a blade on a running web of paper or cardboard guided by a roll in coating machines and similar systems.

SUMMARY OF THE INVENTION

An objective of the invention is to provide simple means for adjusting the angle of a metering (i.e. coating) blade without measuring the blade angle directly. (The blade angle is the angle of inclination of the tip of the blade at the web or roll.)

According to the invention, a coating device for metering a coating composition onto a running web of material guided by a counter roll disposed in the vicinity of the device includes a coating blade in contact with the counter roll or the running web of material. The blade and the roll (or the running web of material) define an angle of contact. At least one noncontacting sensor is disposed in the vicinity of the coating blade and is in communication therewith. The sensor provides a signal indicative of a position of the coating blade. Apparatus for adjusting the transverse profile of the coating composition on the roll or the running web of material are operatively connected to the sensor. The device includes a receiver for receiving and recording the signal of the sensor and a control device for controlling the annular position of the coating blade as a function of the sensor signal. The angle of contact of the coating blade and either the roll or the running web of material is determined as a function of a known pressing pressure (or a proportional value thereof) of the coating blade caused by the profile adjustment apparatus.

Other objects and advantages of the invention will be apparent to those skilled in the art from the following detailed description taken in conjunction with the drawings and the appended claims.

DETAILED DESCRIPTION OF THE INVENTION

Figure 1:
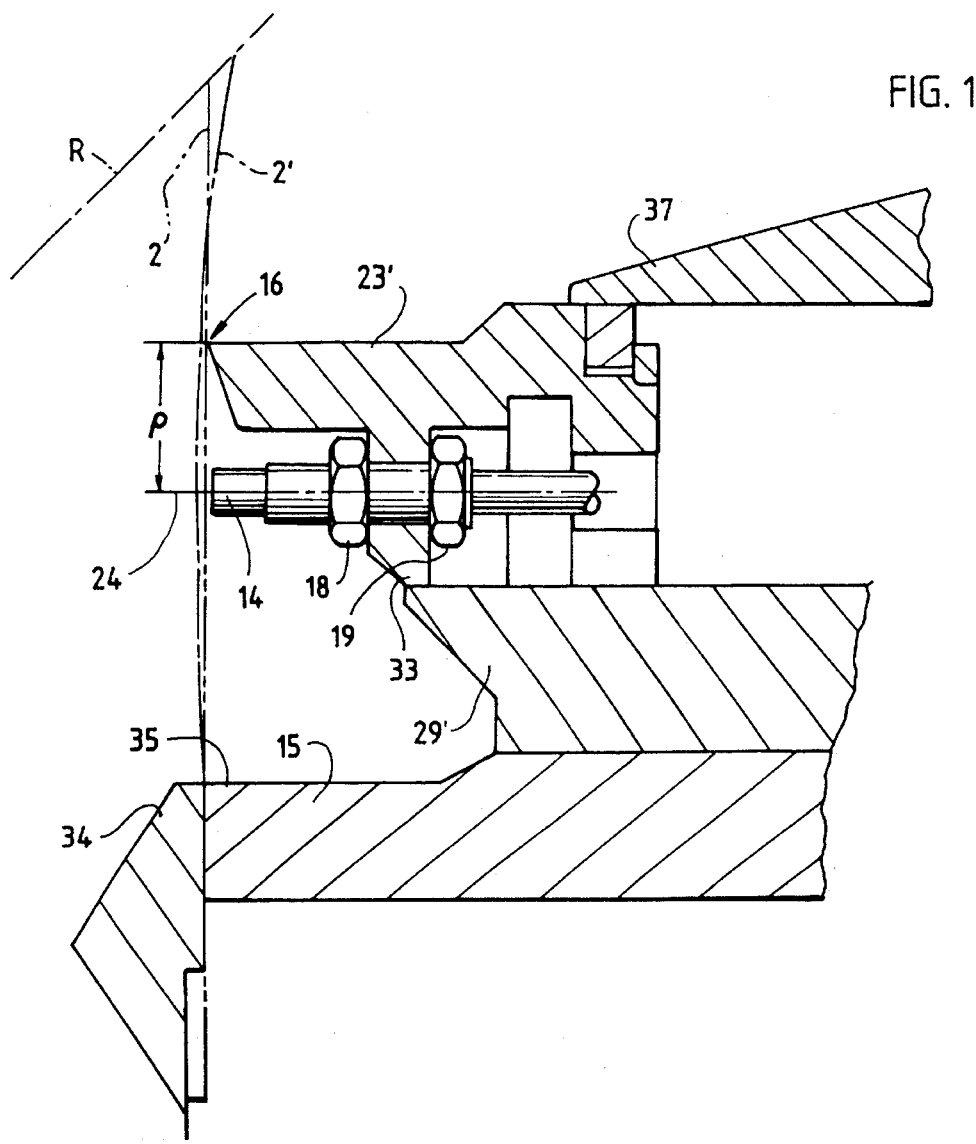
FIG. 1 is a partial cross-sectional view of a device according to the invention.

FIG. 1 depicts a partially sectional view of a metering device of the invention disposed adjacent a metering or coating blade 2 guided by a counter roll R.

Figure 2:
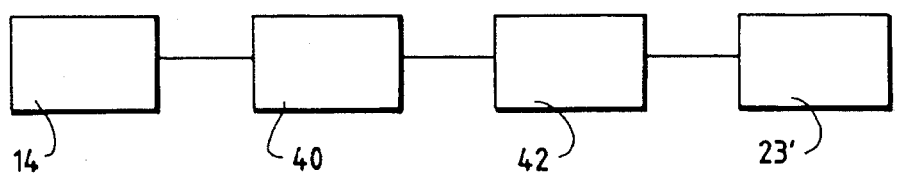
FIG. 2 is a partial schematic view of a portion of the device of FIG. 1.

According to FIGS. 1 and 2, the blade 2 is pressed by profile adjustment means such as a pressure pad 23' along a contact line 16 such that the blade 2 follows the curved dot-dash line 2'. The pressure pad 23' is held in place between guide plates 29' and 37 and can be adjusted locally by means such as compression-tension screws or similar screws or spindles in order to adjust the transverse profile of the paper coating. The plate 29' is supported by clamping means 34 and 15, for example by means of bolts (not shown). A noncontacting measuring probe or sensor 14 is maintained near the pressure pad 23', with a central axis 24 of the probe 14 disposed at a distance p from the contact line 16 of the pressure pad 23' with the blade 2. The sensor 14 is illustratively secured with the aid of screws 18 and 19 in an extension 33 of the pressure pad 23'. (The distance p preferably is between about 0.25 times and about 0.45 times, and highly preferably between about 0.28 times and about 0.37 times the distance between the contact line of the pad 23' at the blade and the outermost edge 35 of the clamping means 15 and 34.) As a result, the measuring probe 14 is always in the region of highest curvature of the blade, as can be seen by comparison of the line 2' with the original straight position of the blade as designated by the line 2.

The sensor 14 can operate inductively, capacitatively, or ultrasonially to produce a signal indicative of the position of the blade. The sensor 14 can also operate according to the principle that an air beam emitted from it in the direction of the blade 2 is damped or banked by the blade and thus a corresponding dynamic pressure is built up in the sensor.

The signal generated by the sensor is received by a receiver 40, for example, as illustrated in FIG. 2, which transmits the signal to a control device 42 which controls the angular position of the blade as a function of the signal.

Figure 3:
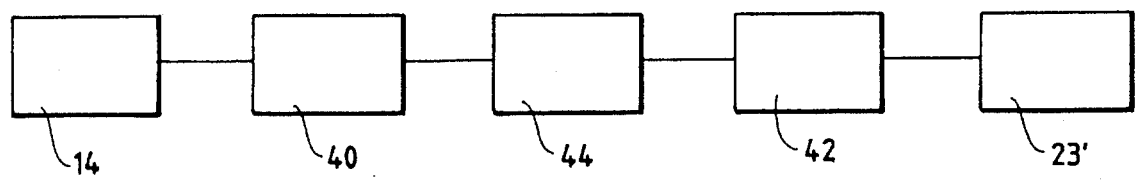
FIG. 3 is a partial schematic view of an alternative embodiment of a portion of the device of FIG. 1.

Thus, based on the known pressing force (or a proportional value thereof) corresponding to the degree of bending of the blade detected by the sensor (which degree of bending is equivalent to the distance of the blade from the sensor) the angular position of the blade can be calculated (e.g. by a computer or microprocessor) 44, as shown in FIG. 3 and, optionally, controlled as by control of the pressure pad 23', for example.

The foregoing detailed description is given for clearness of understanding only, and no unnecessary limitations are to be understood therefrom, as modifications within the scope of the invention will be apparent to those skilled in the art.

We claim:

1. Coating device for metering a coating composition onto a running web of material, said material being at least one of paper and cardboard, said material guided by a counter roll disposed in the vicinity of the device, said device comprising:

(a) a coating blade having a working edge at one end thereof and being in contact with at least one of the counter roll and the running web of material, said blade and at least one of the roll and the material defining an angle of contact;

(b) clamping means for retaining an end of said coating blade opposite said working edge;

(c) means for adjusting the transverse profile of the coating composition on at least one of the roll and the running web of material, said profile adjustment means held in place between guide plates supported by said clamping means;

(d) at least one noncontacting sensor disposed between said profile adjustment means and said clamping means, said at least one noncontacting sensor being in communication with said coating blade and providing a signal indicative of a position of the coating blade;

(e) a receiver for receiving and recording the signal of the sensor; and (f) a control device for controlling the angular position of the coating blade as a function of the sensor signal whereby the angle of contact of the coating blade and at least one of the roll and the running web of material is determined as a function of at least one of a known pressing pressure of the coating blade caused by the profile adjustment means and a corresponding proportional value of the known pressing pressure of the coating blade caused by the profile adjustment means.

2. The device of claim 1 wherein the angle of contact is determined by at least one of a computer and a microprocessor operatively connected to said sensor.

3. The device of claim 1, wherein said profile adjustment means comprises a pressure pad in contact with the coating blade, said pad pressing the coating blade toward the counter roll and wherein the sensor has a central axis disposed at a distance from a contact line of the pressure pad with the blade of between about 0.25 and about 0.45 times the distance between the contact line and an outermost edge of the clamping means.

4. The device of claim 3 wherein the distance between said central axis and said contact line is between about 0.28 and about 0.37 times the distance between the contact line and the outermost edge of the clamping means.

* * * * *